United States Patent
Wakamatsu

(10) Patent No.: US 8,509,609 B2
(45) Date of Patent: Aug. 13, 2013

(54) IMAGE STABILIZATION CONTROL APPARATUS AND CONTROL METHOD THEREOF, OPTICAL APPARATUS, AND IMAGING APPARATUS

(75) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 106 days.

(21) Appl. No.: 13/191,059

(22) Filed: Jul. 26, 2011

(65) Prior Publication Data

US 2012/0033954 A1  Feb. 9, 2012

(30) Foreign Application Priority Data

Aug. 9, 2010  (JP) ................. 2010-179007

(51) Int. Cl.
*G03B 17/00*  (2006.01)
(52) U.S. Cl.
USPC ...................... 396/55; 348/208.99
(58) Field of Classification Search
USPC ................. 396/52, 55; 348/208.99
See application file for complete search history.

(56) References Cited

U.S. PATENT DOCUMENTS

| | | | |
|---|---|---|---|
| 2005/0225646 A1* | 10/2005 | Shintani | 348/208.99 |
| 2005/0285948 A1* | 12/2005 | Weinberg | 348/208.99 |
| 2006/0072019 A1* | 4/2006 | Stavely et al. | 348/208.99 |
| 2006/0098098 A1* | 5/2006 | Seo | 348/208.99 |
| 2007/0132856 A1* | 6/2007 | Saito et al. | 348/208.99 |
| 2009/0059372 A1* | 3/2009 | Kawauchi et al. | 359/554 |
| 2010/0013937 A1* | 1/2010 | Washisu et al. | 348/208.2 |
| 2010/0254688 A1* | 10/2010 | Masuda | 396/55 |
| 2011/0063458 A1* | 3/2011 | Washisu et al. | 348/208.2 |

FOREIGN PATENT DOCUMENTS

| | | |
|---|---|---|
| JP | 06-245136 A | 9/1994 |
| JP | 07-225405 | 8/1995 |
| JP | 11-271831 A | 10/1999 |
| JP | 2010-025962 | 2/2010 |
| JP | 2010-025965 A | 2/2010 |
| JP | 2010-054883 A | 3/2012 |

OTHER PUBLICATIONS

May 18, 2012 Japanese Office Action, which is enclosed without an English Translation, that issued in Japanese Patent Application No. 2010-179007.

* cited by examiner

*Primary Examiner* — Clayton E Laballe
*Assistant Examiner* — Warren K Fenwick
(74) *Attorney, Agent, or Firm* — Cowan, Liebowitz & Latman, P.C.

(57) ABSTRACT

An image stabilization control apparatus having a compensation member comprises: first and second detection units that detect rotational and translational shakes, respectively, in the image stabilization control apparatus; a rotational shake amount calculation unit that finds a rotational shake amount based on an output of the first detection unit; a correction value calculation unit that calculates a correction value based on outputs from the first and second detection units; a suppression unit that suppresses the correction value based on the size of an output from the first and/or second detection units; a translational shake amount calculation unit that calculates a translational shake amount using the output of the first detection unit and the calculated correction value; and a driving unit that drives the compensation member based on the rotational and translational shake amounts, wherein the correction value is calculated based on the suppressed correction value.

14 Claims, 14 Drawing Sheets

IMAGE STABILIZATION CONTROL APPARATUS AND CONTROL METHOD THEREOF, OPTICAL APPARATUS, AND IMAGING APPARATUS

BACKGROUND OF THE INVENTION

1. Field of the Invention

The present invention relates to an image stabilization control apparatus that compensate image blur (image degradation) caused by shakes such as hand shakes, and relates to control methods for such an image stabilization control apparatus, an optical apparatus, and an imaging apparatus.

2. Description of the Related Art

At present, cameras provided with image stabilization control apparatuses that prevent image blur caused by hand shakes and are configured with, for example, a shake compensation unit, a driving unit, and a shake detection unit are in commercial production, and as a result, user-caused shooting mistakes are decreasing.

Furthermore, image stabilization control apparatuses that detect rotational shakes using an angular velocity sensor and suppress image blur on the surface of an image sensor by moving part of a lens, the image sensor, or the like are employed in various types of optical apparatuses as a useful image blur compensation technique.

However, when shooting at close ranges, shooting at a high magnification ratio, and so on, image degradation caused by what are known as "translational shakes", which act in the translational or vertical direction relative to the optical axis of the camera and cannot be detected solely by an angular velocity sensor, cannot be ignored. It is necessary to actively detect and compensate translational shakes in, for example, the case where an image is shot from approximately 20 cm from the subject, as in macro shooting, the case where the focal length of the imaging optical system is extremely long (for example, 400 mm) when the camera is approximately 1 m away from the subject, and so on.

Japanese Patent Laid-Open No. 7-225405 discloses a technique where an acceleration sensor that detects acceleration is provided, translational shakes are found from a second-order integral of the acceleration obtained by the acceleration sensor, and a shake compensation unit is driven based on the translational shake and the output of a separate angular velocity sensor.

However, the output of the acceleration sensor used to detect translational shakes is susceptible to environmental changes such as noise from disturbances, changes in temperature, and so on, and because such unstable factors are exacerbated by taking the second-order integral, there is a problem in that highly-precise translational shake compensation is difficult to achieve.

Meanwhile, Japanese Patent Laid-Open No. 2010-25962 discloses handling translational shakes as rotational shakes when the center of rotation is located in a position that is distant from the camera. With this method, an angular velocity sensor and an acceleration sensor are provided, and shake compensation is carried out by finding a compensation value and an angle using the radius of rotation of the rotational shake based on the output from the sensors; through this, a center of rotation that is limited to a frequency band unsusceptible to disturbances is found. Doing so makes it possible to reduce unstable factors in the acceleration sensor as described above.

With methods that carry out translational shake compensation using the radius of rotation of rotational shakes, it is necessary to find the radius of rotation precisely, and thus in the case where the radius of rotation is calculated using an acceleration sensor and an angular velocity sensor, the detection precision of those sensors is extremely important. However, in the case where the influence of sensor noise is high, it is difficult to find the precise radius of rotation, which in turn makes it difficult to achieve the desired translational shake compensation effects. In the case where the ratio of sensor noise to the output of the acceleration sensor is particularly high, there is the risk that the radius of rotation will be erroneously estimated, the compensation amount of translational shake will increase, and the stabilization performance will worsen due to overcorrection.

Generally speaking, the amount of sensor noise is constant regardless of the amount of acceleration, and thus in the case where translational shakes are great, or in other words, in the case where the acceleration sensor outputs a high value, the sensor noise has little effect on the estimation of the radius of rotation, and a precise compensation amount of translational shake can be found. However, in the case where the translational shakes are extremely small, or in other words, in the case where the acceleration sensor outputs a low value, the sensor noise has a significant effect on the estimation of the radius of rotation, and it is thus difficult to find a precise compensation amount of translational shake. In other words, differences arise in the detection precision of translational shakes due to differences in instability amounts caused by different shooting positions and so on, or to put it differently, differences in the stabilizing effects arise.

Meanwhile, there are situations where the user carries out shooting operations while framing the subject he or she wishes to shoot by tracking the subject, situations where the user carries out shooting operations while adjusting shift in the angle of view arising due to hand shakes, and so on. In cases such as these, translational shakes caused by the user intentionally moving the camera occur in addition to the translational shakes caused by unintentional hand shakes on the part of the user. If translational shake compensation using the radius of rotation of the rotational shakes is carried out at this time, the radius of rotation takes on an extremely high value during panning or tilting operations, which results in the possibility of the radius of rotation being erroneously estimated during shooting that immediately follows the panning or tilting operations. Specifically, there have been situations in which excessive compensation amount of translational shake employed during shooting immediately following panning or tilting operations have negatively affected the stabilization effects of the shake compensation.

SUMMARY OF THE INVENTION

The present invention has been made in consideration of the above situation, and enables highly-precise shake compensation for translational shakes using an image stabilization control apparatus that is both small in size and highly-mobile.

According to the present invention, provided is an image stabilization control apparatus that includes a compensation member, the apparatus comprising: a first detection unit that detects rotational shakes; a second detection unit that detects translational shakes in the image stabilization control apparatus using a different method than the first detection unit; a rotational shake amount calculation unit that finds a rotational shake amount based on an output of the first detection unit; a correction value calculation unit that calculates a correction value based on outputs from the first and second detection units; a suppression unit that suppresses the correction value based on the size of an output from at least one of the first and second detection units; a translational shake amount calculation unit that calculates a translational shake amount using the output of the first detection unit and the correction value calculated by the correction value calculation unit; and a driving unit that drives the compensation member based on the rotational shake amount and the translational shake amount, wherein the correction value calculation unit calculates the correction value based on the suppressed correction value.

According to the present invention, provided is a control method for an image stabilization control apparatus that includes a compensation member, the method comprising: a first detecting step of detecting rotational shakes in the image stabilization control apparatus; a second detecting step of detecting translational shakes in the image stabilization control apparatus using a different method than the first detecting step; a rotational shake amount calculating step of finding a rotational shake amount based on the result of the first detecting step; a correction value calculating step of calculating a correction value based on the results of the first and second detecting steps; a suppressing step of suppressing the correction value based on the size of the result of at least one of the first and second detecting steps; a translational shake amount calculating step of calculating a translational shake amount using the result of the first detecting step and the correction value calculated in the correction value calculating step; and a driving step of driving the compensation member based on the rotational shake amount and the translational shake amount, wherein in the correction value calculating step, the correction value is calculated based on the suppressed correction value.

Further, according to the present invention, provided is an optical apparatus comprising: the image stabilization control apparatus as described above; and a release switch that instructs a shooting preparation operation and a shooting operation, wherein the suppression unit includes: a first upper-limit value calculation unit that calculates a first upper-limit value based on the size of the output from at least one of the first and second detection units; and a second upper-limit value calculation unit that calculates a second upper-limit value, that is higher than the first upper-limit value, based on the size of the output from at least one of the first and second detection units, and wherein the correction value calculation unit includes: a first correction value calculation unit that calculates a first correction value, whose upper limit is the first upper-limit value, based on the outputs of the first and second detection units; a second correction value calculation unit that calculates a second correction value, whose upper limit is the second upper-limit value, based on the outputs of the first and second detection units; and a selection unit that selects whether to use the first upper-limit value or the second upper-limit value, and wherein the selection unit selects the first correction value in the case where the shooting preparation operation is instructed by the release switch, and selects the second correction value in the case where the shooting operation is instructed by the release switch.

Furthermore, according to the present invention, provided is an imaging apparatus comprising the image stabilization control apparatus as described above.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Exemplary embodiments of the present invention will be described in detail in accordance with the accompanying drawings.

First Embodiment

Figure 1:
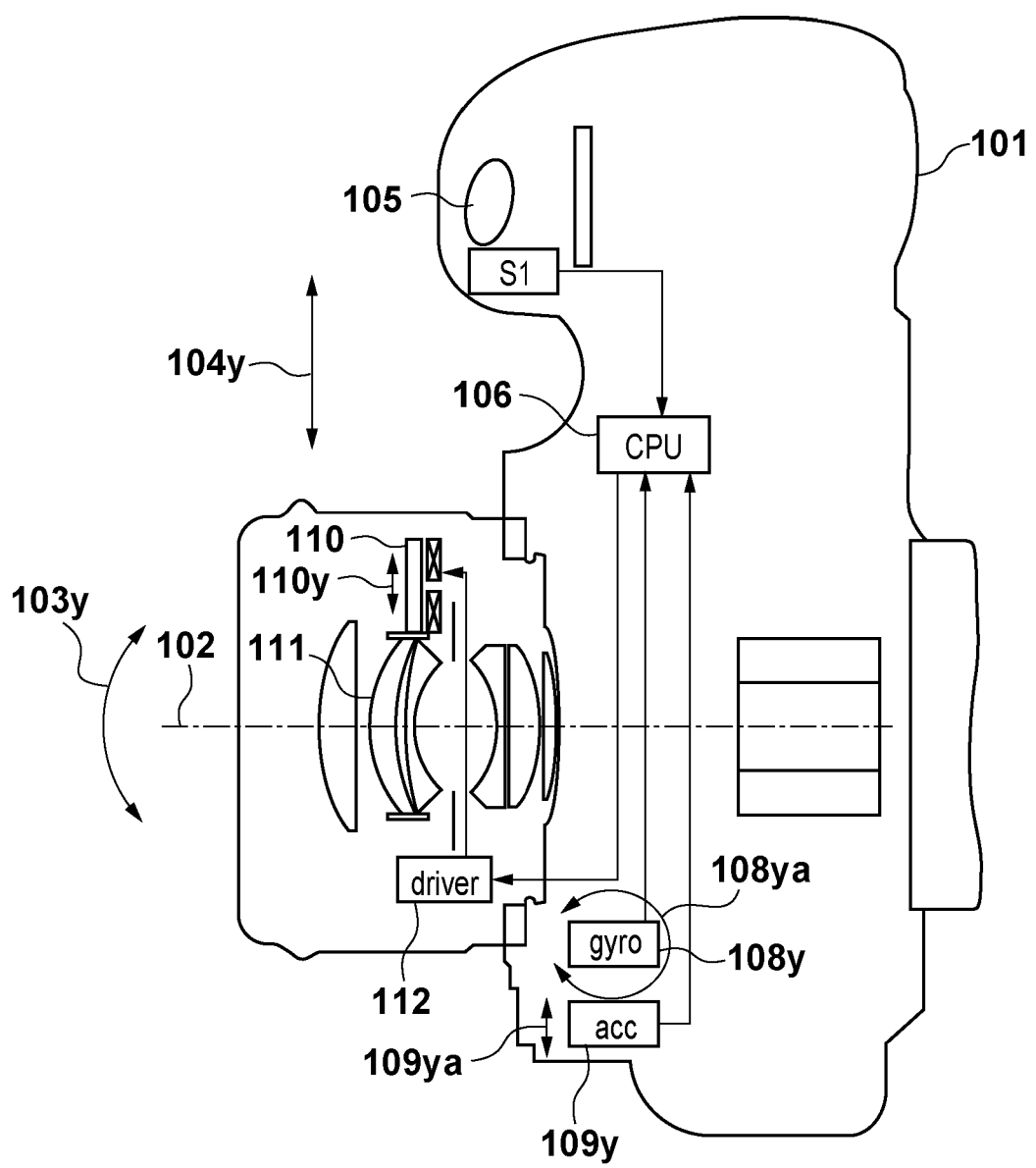
FIG. 1 is a general diagram illustrating the functional configuration of a camera embodying an image stabilization control apparatus, viewed from above, according to an embodiment of the present invention.
Figure 2:
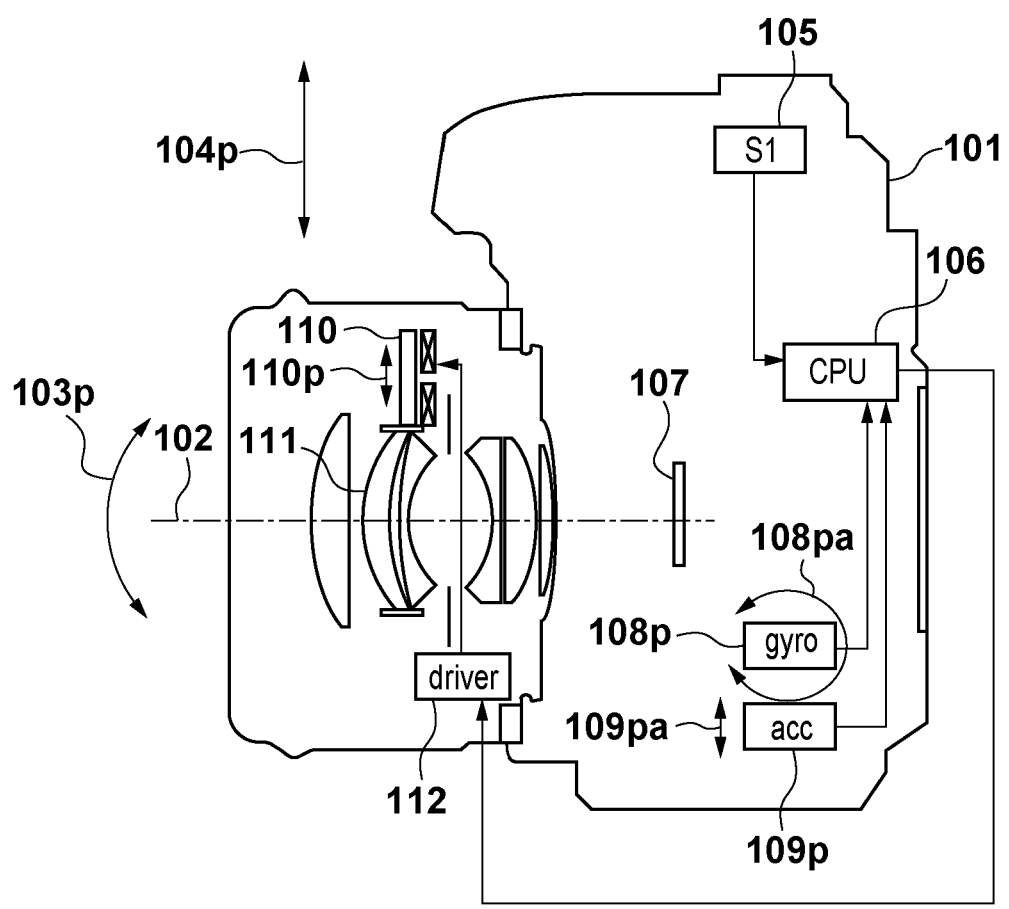
FIG. 2 is a general diagram illustrating the functional configuration of a camera embodying the image stabilization control apparatus, viewed from the side, according to an embodiment of the present invention.

FIGS. 1 and 2 are general diagrams illustrating the functional configuration of a camera 101 embodying an image stabilization control apparatus according to a first embodiment of the present invention, viewed from above and from the side, respectively. A stabilization system provided in this camera 101 compensates shakes indicated by arrows 103$p$ and 103$y$ relative to an optical axis 102 (called "rotational shakes" hereinafter) and shakes indicated by arrows 104$p$ and 104$y$ relative to the optical axis 102 (called "translational shakes" hereinafter).

In the camera 101, 105 indicates a release switch, and 106 indicates a camera CPU. 107 indicates an image sensor, and 108p and 108y indicate angular velocity sensors that detect rotational shakes indicated by arrows 108pa and 108ya, respectively. 109p and 109y, meanwhile, indicate acceleration sensors that detect translational shakes indicated by arrows 109pa and 109ya, respectively, using a different method than the angular velocity sensors 108p and 108y. 110 indicates a shake compensation unit, which freely drives a shake compensation lens 111 along the directions of the arrows 110p and 110y, thus compensating both rotational shakes and translational shakes. Note that the outputs of the angular velocity sensors 108p and 108y and the acceleration sensors 109p and 109y are input into the camera CPU 106. A driving unit 112 then compensates shakes based on these outputs.

Note that in the present first embodiment, what is known as "optical stabilization", in which the shake compensation lens 111 is moved along a plane that is perpendicular to the optical axis based on a calculated compensation amount, is used to compensate shakes. However, the shake compensation method is not limited to optical stabilization, and a method that carries out stabilization by moving the image sensor along a plane that is perpendicular to the optical axis, a method that employs electronic stabilization that reduces the influence of shakes by cutting out images from each frame output by the image sensor and changing the positions thereof, or the like may be used instead. It is also possible to use these methods in combination with each other. In other words, any such method can be applied to the present invention as long as it enables blur to be reduced in or eliminated from images that have been shot based on a calculated compensation amount.

Figure 3:
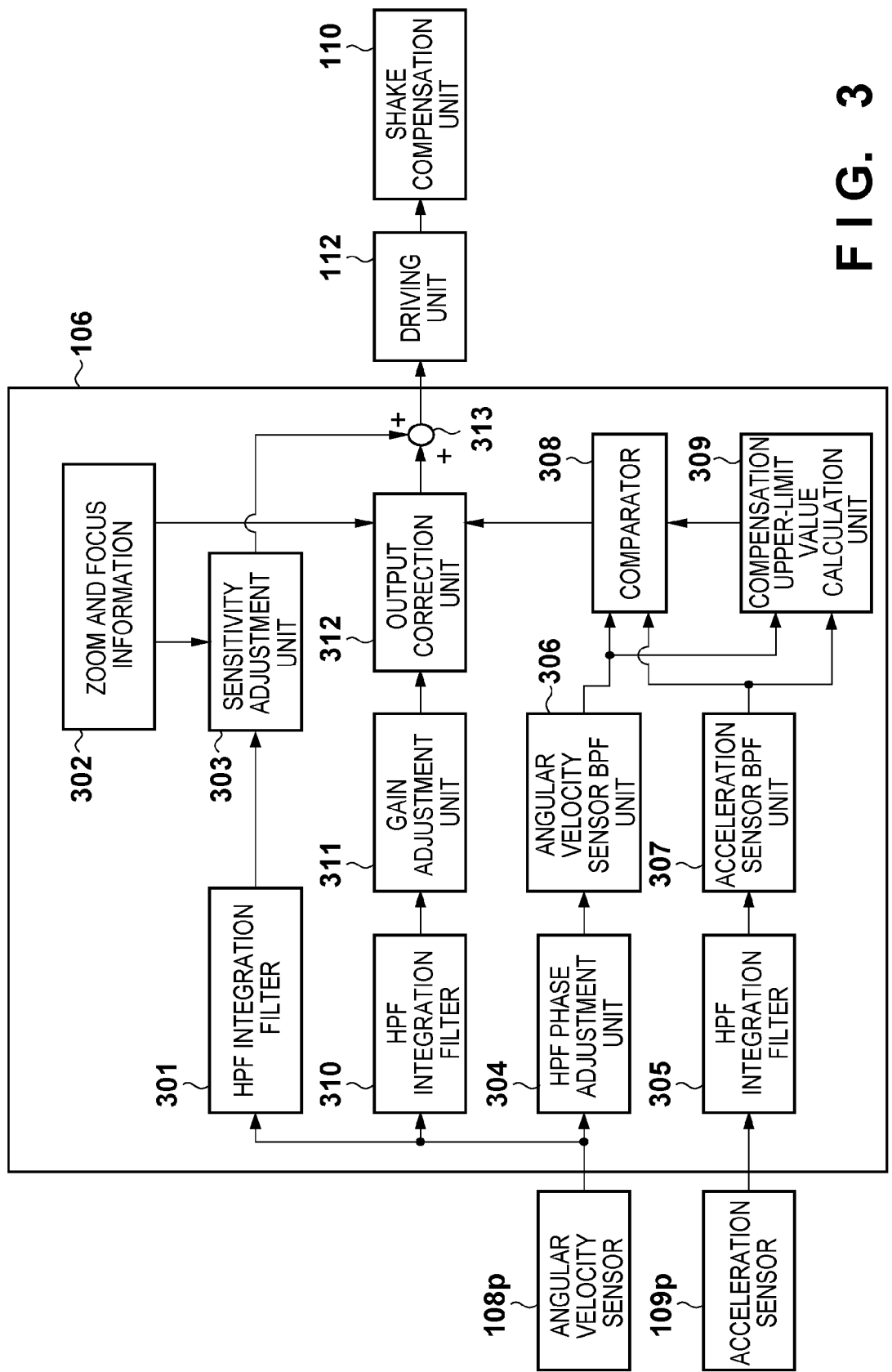
FIG. 3 is a block diagram illustrating an image stabilization control apparatus according to a first embodiment.

FIG. 3 is a block diagram illustrating the image stabilization control apparatus according to the first embodiment. FIG. 3 only illustrates a configuration for shakes that occur in the vertical direction of the camera (that is, the pitch direction, or the directions indicated by the arrows 103p and 104p in FIG. 2). However, a similar configuration is also provided for shakes that occur in the horizontal direction of the camera (that is, the yaw direction, or the directions indicated by the arrows 103y and 104y in FIG. 1). Because these configurations are basically the same, only the configuration for the pitch direction is illustrated in the drawings, and the following descriptions will be given based thereon.

First, a procedure for finding a rotational shake amount will be described using FIG. 3. An angular velocity signal is input into the CPU 106 from the angular velocity sensor 108p. The angular velocity signal has been input into an HPF integration filter 301, and after the DC component has been cut by the high pass filter (HPF), the resultant is integrated and converted into an angular signal. Here, because the frequency band of hand shakes is generally between 1 Hz to 10 Hz, the HPF has first order HPF characteristics that cut only the frequency components not more than, for example, 0.1 Hz, which is well below the frequency band of hand shakes.

The output of the HPF integration filter 301 is input into a sensitivity adjustment unit 303. The sensitivity adjustment unit 303 amplifies the output of the HPF integration filter 301 based on a magnification ratio and a focal length found based on zoom and focus information 302, resulting in a rotational shake compensation target value (rotational shake amount). The sensitivity adjustment unit 303 is provided because the shake compensation sensitivity, which corresponds to the ratio of the shake amount of the camera image surface to the amount of movement of the compensation lens 111, changes due to changes in optical information such as the focus and zoom of the lens.

Next, a procedure for finding a translational shake amount will be described. The angular velocity signal from the angular velocity sensor 108p is input into the aforementioned HPF integration filter 301, and is also input into an HPF integration filter 310; after the DC component has been cut by the HPF, the resultant is integrated and converted into an angular signal. The output of the HPF integration filter 310 is input into a gain adjustment unit 311. The gain and phase characteristics within the frequency band that is to undergo translational shake compensation are adjusted by the gain adjustment unit 311 and the HPF integration filter 310. The output of the gain adjustment unit 311 is input into an output correction unit 312.

At the same time the above processing is being carried out, the angular velocity signal from the angular velocity sensor 108p is input into an HPF phase adjustment unit (HPF phase adjustment filter) 304, where the DC component that superimposes on the output of the angular velocity sensor 108p is cut and phase adjustment is carried out on the resulting signal. The cutoff frequency employed here is aligned with the HPF cutoff frequency of an HPF integration filter 305, mentioned later, and is adjusted so that the frequency characteristics match. Only the frequency component of a predetermined bandwidth is extracted from the output of the HPF phase adjustment unit 304 by an angular velocity sensor band pass filter (BPF) unit 306.

Meanwhile, the output of the acceleration sensor 109p is input into the HPF integration filter 305 of the CPU 106, and after the DC component thereof has been cut by the HPF, the resultant is integrated and converted into a velocity signal. The HPF cutoff frequency at this time is, as described above, set in accordance with the HPF frequency characteristics of the HPF phase adjustment unit 304. Only the frequency component of a predetermined bandwidth is extracted from the output of the HPF integration filter 305 by an acceleration sensor band pass filter (BPF) unit 307.

A compensation upper-limit value is calculated by a compensation upper-limit value calculation unit 309 based on the output of the angular velocity sensor BPF unit 306 and the acceleration sensor BPF unit 307. The calculated compensation upper-limit value is input into a comparator 308 along with the output of the angular velocity sensor BPF unit 306 and the acceleration sensor BPF unit 307; a correction value for correcting the output of the gain adjustment unit 311 is then calculated and output to the output correction unit 312. The method by which the compensation upper-limit value calculation unit 309 calculates the compensation upper-limit value and the method by which the comparator 308 calculates the correction amount will be described later.

The zoom and focus information 302 is also input into the output correction unit 312, and a magnification ratio is calculated from the zoom and focus information 302. The output of the gain adjustment unit 311 is then corrected based on the magnification ratio that has been found and the correction amount from the comparator 308, resulting in a translational shake compensation target value (translational shake amount).

The rotational shake compensation target value and translational shake compensation target value found in the manner described above are added together by an adder 313, and the resulting sum is output to the driving unit 112. The driving unit 112 drives shake compensation unit 110 based on this sum, and shakes resulting from both rotational shakes and translational shakes are compensated as a result.

Figure 4:
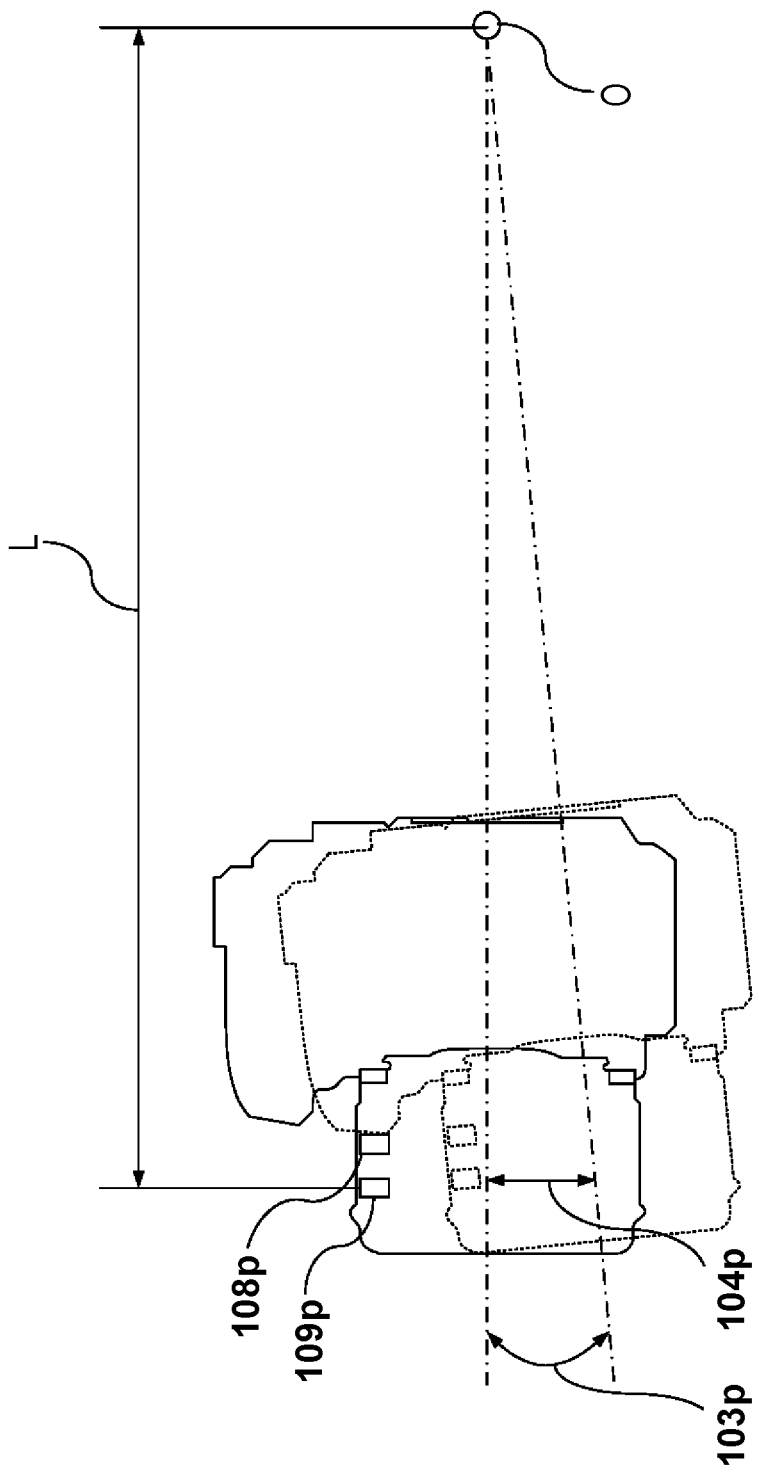
FIG. 4 is a descriptive diagram illustrating the center of rotation of a shake according to the first embodiment.

Next, the correction value output from the comparator 308 will be described. FIG. 4 is a diagram illustrating rotational shakes 103p and translational shakes 104p that act on the camera 101. Here, the shake amount of the translational shakes 104p at the principal point of the optical imaging system in the shooting lens of the camera 101 is taken as Y, whereas the shake angle of the rotational shakes 103p is taken as θ. A center of rotation O is then determined, and when the radius of rotation, which is the distance from the center of rotation O to the acceleration sensor 109p, is taken as L, the relationship between the shake amount Y, the shake angle θ, and the radius of rotation L can be expressed by the following Formula (1).

$$Y = L\theta \tag{1}$$

Note that in Formula (1), the shake amount Y can be found by taking a second-order integral of the output of the acceleration sensor 109p, and the shake angle θ can be found by taking a first-order integral of the output of the angular velocity sensor 108p. Meanwhile, the relationship between a velocity V found by taking a first-order integral of the output of the acceleration sensor 109p, an angular velocity ω obtained from the output of the angular velocity sensor 108p, and the radius of rotation L can be expressed by the following Formula (2).

$$V = L\omega \tag{2}$$

Furthermore, the relationship between an acceleration A obtained from the output of the acceleration sensor 109p, an angular acceleration ωa found by taking the first-order differential of the output of the angular velocity sensor 108p, and the radius of rotation L can be expressed by the following Formula (3).

$$A = L\omega a \tag{3}$$

The radius of rotation L can be found through any of the aforementioned Formulas (1) through (3).

Meanwhile, a shake δ occurring in the imaging surface can be expressed through the following Formula (4), using the shake amount Y of the translational shake at the principal point of the optical imaging system, the shake angle θ of the optical imaging system, and a focal length f and magnification ratio β of the optical imaging system.

$$\delta = (1+\beta)f\theta + \beta Y \tag{4}$$

Here, the focal length f, which is the first term on the right side of the Formula (4), is found from the zoom and focus information 302 of the optical imaging system. In addition, the magnification ratio β expresses the ratio of the size of an image of a subject formed on the image sensor 107 relative to the actual size of the subject, and is also found from the zoom and focus information 302 of the optical imaging system. Furthermore, the shake angle θ can be found from the integration result of the output of the angular velocity sensor 108p. Accordingly, the translational shake compensation target value can be found from these information, as described using FIG. 3.

Meanwhile, the second term on the right side of the Formula (4) is found from the shake amount Y, which is the second-order integral value of the acceleration sensor 109p, and the magnification ratio β, and thus the translational shake compensation target value can be found from these information, as described using FIG. 3.

However, in the present first embodiment, shake compensation is carried out on the shake δ, expressed by the following Formula (5) using the Formulas (1) and (4).

$$\delta = (1+\beta)f\theta + \beta L\theta \tag{5}$$

In other words, for the translational shake, the shake amount Y found directly from the acceleration sensor 109p is not used. Instead, first, the radius of rotation L is found from Formula (1), Formula (2), or Formula (3), and the compensation is carried out using the radius of rotation L, the shake angle θ, which is the integration result of the output of the angular velocity sensor 108p, and the magnification ratio β obtained using the zoom and focus information 302. Here, with a method that corrects the shake amount Y of the translational shake using the shake angle θ and the radius of rotation L, it is necessary to find the radius of rotation L in a precise manner, as described earlier.

The method by which the compensation upper-limit value calculation unit 309 calculates the compensation upper-limit value and the method by which the comparator 308 calculates the correction amount will be described hereinafter.

Figure 5:
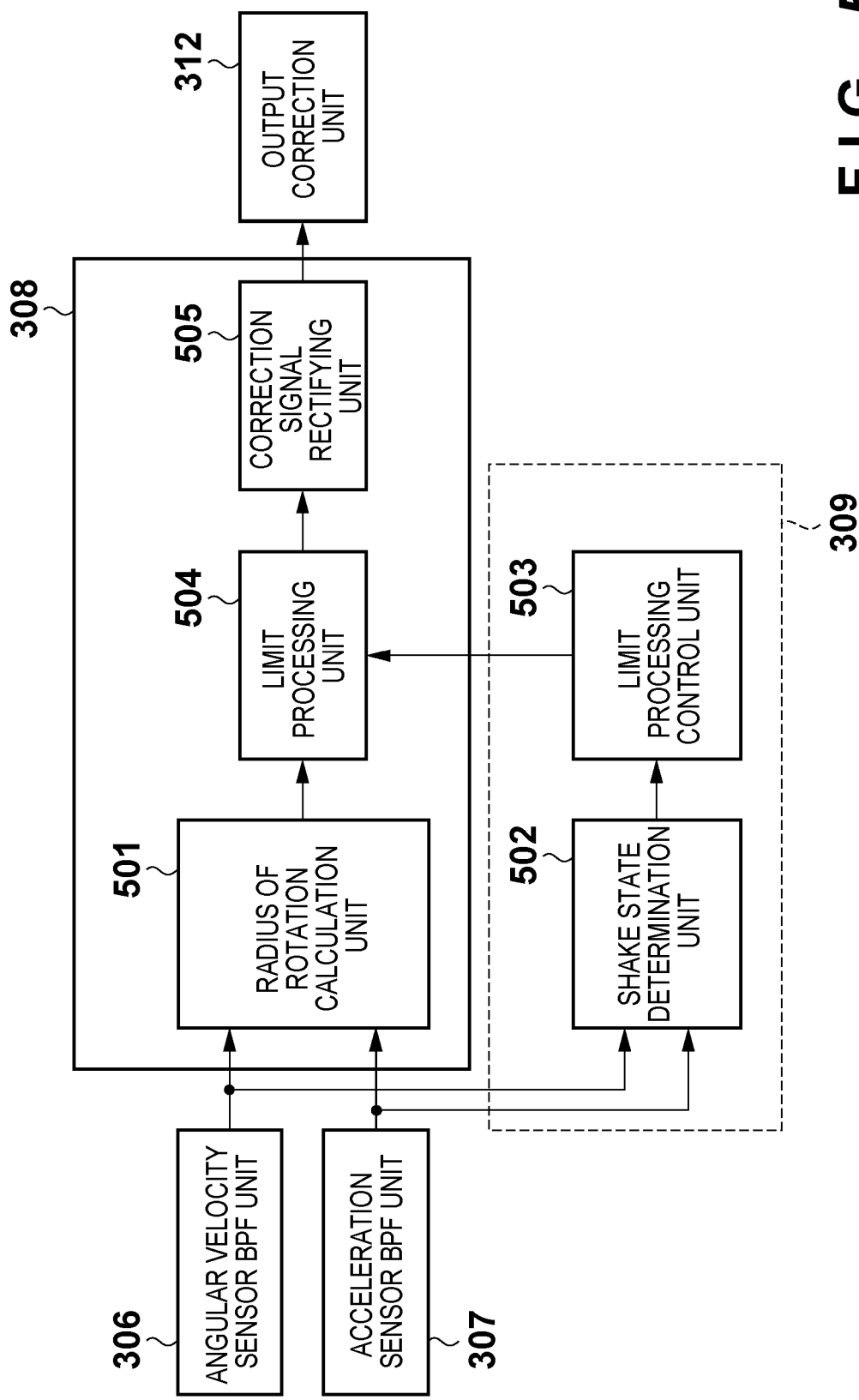
FIG. 5 is a block diagram illustrating, in detail, the configuration of the comparator and the compensation upper-limit value calculation unit illustrated in FIG. 3.

FIG. 5 is a block diagram illustrating the configurations of the compensation upper-limit value calculation unit 309 and the comparator 308 shown in FIG. 3. First, in the comparator 308, a radius of rotation calculation unit 501 calculates the radius of rotation L by solving Formula (2) for L, which results in Formula (6), based on the output of the angular velocity sensor BPF unit 306 and the acceleration sensor BPF unit 307.

$$L = V/\omega \tag{6}$$

The radius of rotation L may be calculated from the ratio between the maximum amplitude peak values of the velocity V and the angular velocity ω within a predetermined amount of time (for example, set to approximately 200 ms in the case where the cutoff frequency of the angular velocity sensor BPF unit 306 and the acceleration sensor BPF unit 307 is 5 Hz). Furthermore, the radius of rotation L may be updated each time the velocity V and the angular velocity ω, respectively, have been calculated. At this time, a radius of rotation from which a high-frequency noise component occurring when the radius of rotation is calculated has been removed can be calculated by averaging the velocity V and the angular velocity ω in time sequence, cutting the high-frequency component using a low-pass filter (LPF), and so on.

Figure 6:
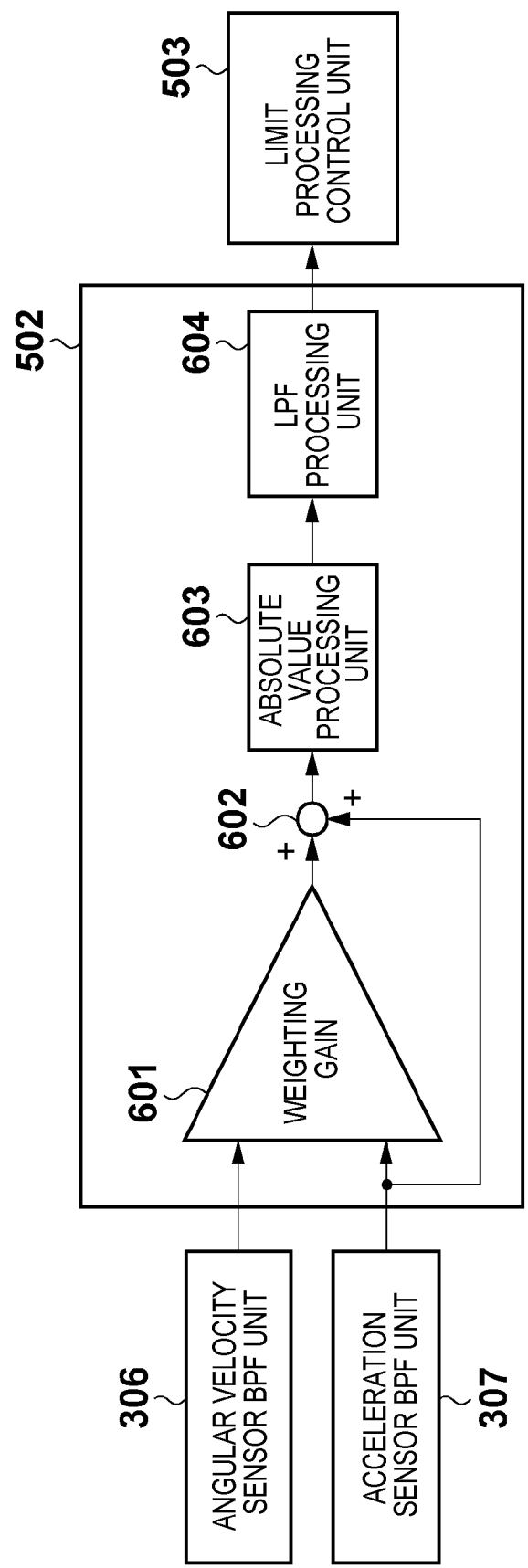
FIG. 6 is a block diagram illustrating, in detail, the configuration of the shake state determination unit illustrated in FIG. 5.

At the same time the above processing is being carried out, the outputs of the angular velocity sensor BPF unit 306 and the acceleration sensor BPF unit 307 are input into a shake state determination unit 502 in the compensation upper-limit value calculation unit 309, and a shake state signal for determining the upper-limit value of the radius of rotation is generated by a limit processing control unit 503. The method by which the shake state determination unit 502 calculates the shake state signal and the method by which the limit processing control unit 503 calculates the radius of rotation upper-limit value will be described using the block diagram in FIG. 6.

The output of the angular velocity sensor BPF unit 306 is input into an amp 601, where that output is multiplied by a set coefficient. The coefficient k of the amp 601 is obtained so that V=kLω holds, with setting the value of the radius of rotation L to, for example, near 100 mm that is close to the actual hand shake radius of rotation, in order to set the outputs of the angular velocity sensor BPF unit 306 and the acceleration sensor BPF unit 307 to the same level.

In addition, there is a method that sets the coefficient based on whether the influence of sensor noise from the angular velocity sensor or the acceleration sensor is greater. For example, in the case where the influence of noise for the acceleration caused by hand shakes in the acceleration sensor is greater than that for the angular velocity in the angular velocity sensor, the coefficient is set so that the output of the angular velocity sensor is weighted more. Doing so makes it possible to determine the presence of shakes having eliminated the influence of sensor noise to the greatest extent possible.

Meanwhile, although the output of the angular velocity sensor BPF unit 306 is multiplied by the coefficient in the first embodiment, the output of the acceleration sensor BPF unit 307 may be multiplied by the coefficient instead. Alternatively, the output of the angular velocity sensor BPF unit 306 and the output of the acceleration sensor BPF unit 307 may each be multiplied by the coefficient.

Figure 7:
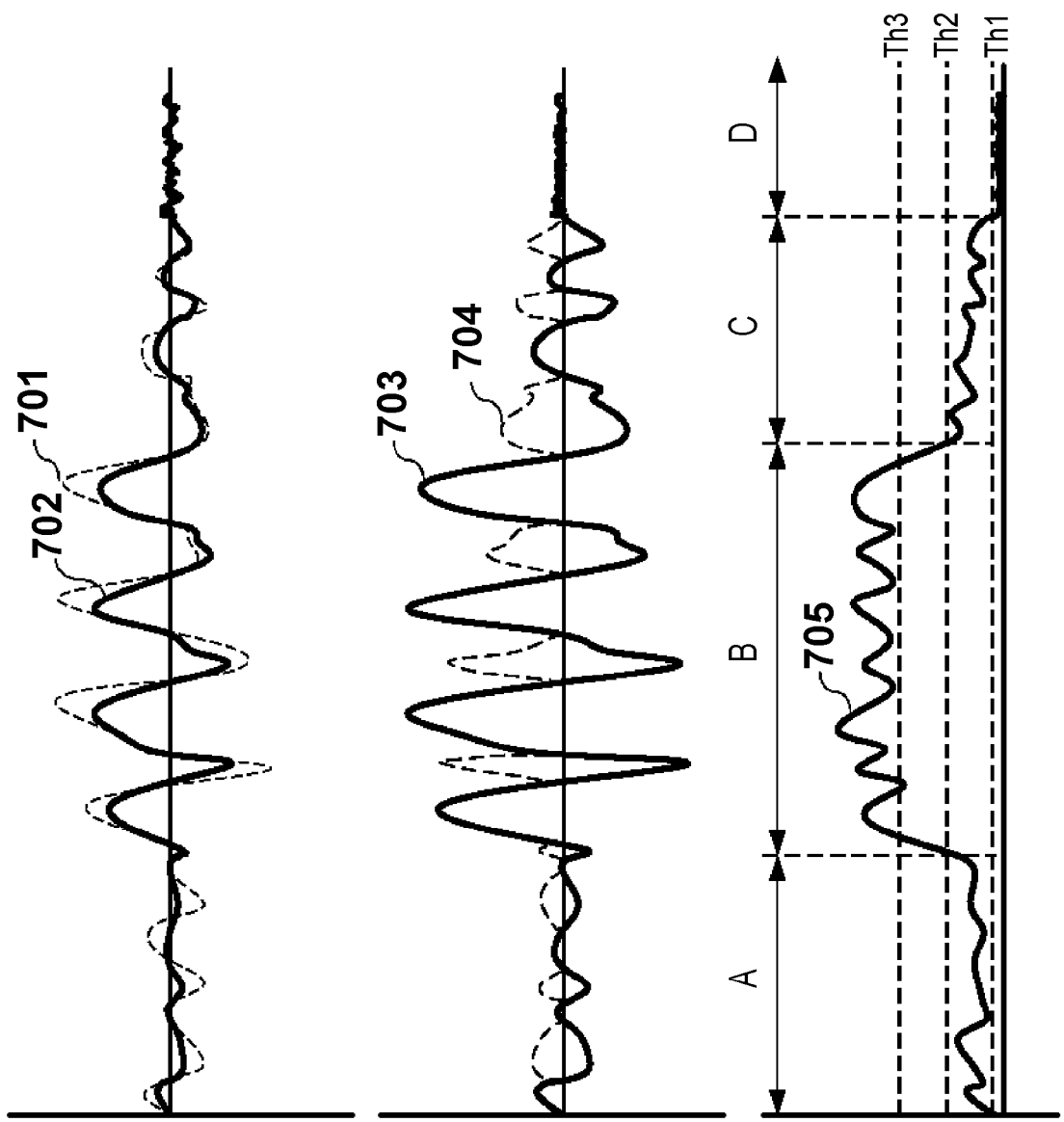
FIG. 7A is a diagram illustrating an example of the outputs of an amp 601 and of an acceleration sensor BPF unit 307.
FIG. 7B is a diagram illustrating an example of the outputs of an adder 602 and of an absolute value processing unit 603.
FIG. 7C is a diagram illustrating an example of the output of an LPF 604.

Here, an example of the output of the amp 601, in which the output of the angular velocity sensor BPF unit 306 has been multiplied by the coefficient, is indicated by 701 in FIG. 7A, whereas an example of the output of the acceleration sensor BPF unit 307 is indicated by 702 in FIG. 7A.

Next, the output of the amp 601, in which the output of the angular velocity sensor BPF unit 306 has been multiplied by the coefficient, and the output of the acceleration sensor BPF unit 307, are added together by an adder 602. An example of the output of the adder 602 is indicated by 703 in FIG. 7B. The output 703 of the adder 602 is converted to an absolute value by an absolute value processing unit 603, resulting in a signal 704, indicated in FIG. 7B. The high-frequency component of the signal 704 from the absolute value processing unit 603 is cut by a low-pass filter (LPF) in an LPF processing unit 604, and the resultant is then output. Here, the LPF cutoff frequency is set to, for example, a low cutoff frequency that is not more than 0.5 Hz, and thus the signal 704 shown in FIG. 7B becomes a signal 705, illustrated in FIG. 7C, after the LPF processing.

Here, the LPF processing unit 604 may employ a method such as where a movement average over a predetermined period is calculated. In addition, the shake determination may be carried out using either the output of the angular velocity sensor BPF unit 306 or the output of the acceleration sensor BPF unit 307. In this case, either the output of the angular velocity sensor BPF unit 306 or the output of the acceleration sensor BPF unit 307 is input into the absolute value processing unit 603, after which an LPF-processed signal can be obtained in the same manner as with the method described above.

During periods in which hand shakes are extremely large, such as period (B) in FIG. 7C, the output value of the LPF processing unit 604 is high, whereas during periods in which hand shakes are extremely small, such as period (D) in FIG. 7C, the output value of the LPF processing unit 604 is low.

Next, the output of the LPF processing unit 604, or in other words, the output of the shake state determination unit 502, is input into the limit processing control unit 503, where a signal that sets the upper-limit value of the radius of rotation is calculated. The limit processing control unit 503 calculates the upper-limit value of the radius of rotation using a table such as that shown in FIG. 8. In order to determine the shake state of the output value of the LPF processing unit 604, thresholds such as Th3, Th2, and Th1 shown in FIG. 7C are set in advance, and the upper-limit value of the radius of rotation is set based on a table such as that shown in FIG. 8 depending on which range the output value of the LPF processing unit 604 falls within. For example, in the case where the output value of the LPF processing unit 604 is Th1, the upper-limit value of the radius of rotation, which is the output of the limit processing control unit 503, is set to Li1. In cases such as where the output value of the LPF processing unit 604 is between Th3 and Th2, the result of calculating a linear interpolation between Li3 and Li2 is set as the upper-limit value of the radius of rotation.

Next, the output value of the limit processing control unit 503 and the output value of the radius of rotation calculation unit 501 are input into a limit processing unit 504. Then, if the output value of the radius of rotation calculation unit 501 is greater than or equal to the upper-limit value of the radius of rotation output by the limit processing control unit 503, the upper-limit value is fixed. Meanwhile, if the output value of the radius of rotation calculation unit 501 is lower than the upper-limit value of the radius of rotation, the output value of the radius of rotation calculation unit 501 is output as-is.

The output value of the limit processing control unit 503 is rectified, by a correction signal rectifying unit 505, so that sudden step-like changes do not occur in the correction signal, after which the resulting signal is input into the output correction unit 312.

Here, the first method for rectification is a method that cuts the high-frequency component using an LPF, and the LPF cutoff frequency used here is set to a low cutoff frequency that is not more than, for example, 0.5 Hz. Alternatively, a method such as where a movement average over a predetermined period is calculated may be employed instead.

Figure 9:
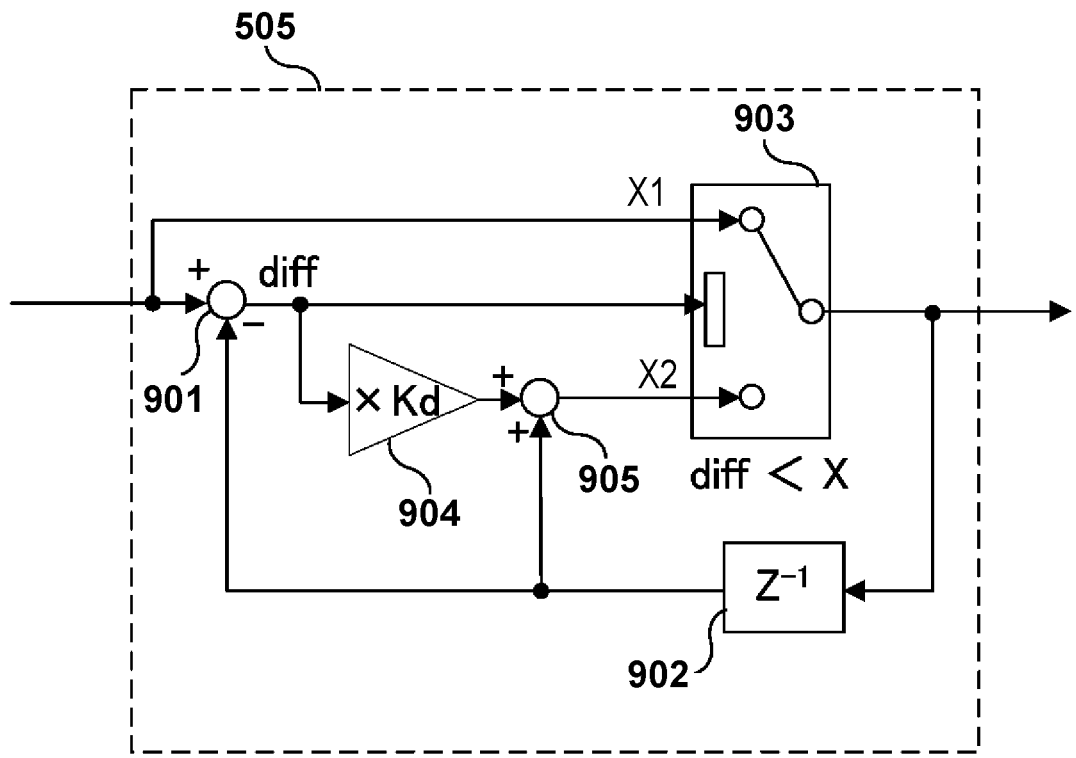
FIG. 9 is a block diagram illustrating, in detail, the configuration of the signal rectifying unit illustrated in FIG. 5.

The second method will be described with reference to the block diagram illustrated in FIG. 9. The output value of the limit processing unit 504 is input into a subtractor 901, and sampling data of the output value of the correction signal rectifying unit 505 from one cycle previous is subtracted therefrom. The output of the subtractor 901 is denoted by diff. The output diff is input into a condition comparator 903, where it is determined whether or not diff is lower than a predetermined value set in advance. In the case where the output diff is lower than the predetermined value, X1, which is the output value of the limit processing unit 504, is selected, and is output as the output value of the correction signal rectifying unit 505.

However, in the case where the output diff is greater than or equal to the predetermined value, X2 is selected and is output as the output value of the correction signal rectifying unit 505. The method for calculating X2 is described below. the output diff is multiplied by a gain Kd, which is a predetermined value set in advance, in a multiplier 904. Then, X2 is calculated by adding the output of the multiplier 904 to the output value of the correction signal rectifying unit 505 from one cycle previous in an adder 905. Here, the gain Kd is set to a value that is lower than 1, and is set so that sudden changes in the radius of rotation do not occur in the case where the output diff is greater than or equal to the predetermined value.

X1 is always selected if the output diff is a negative value as a result of this process. Accordingly, the output value of the correction signal rectifying unit 505 moves in the direction in which the value decreases without delay, but in the case where the output diff is a positive value and the amount of change is great, sudden changes are suppressed.

According to the aforementioned method, sudden changes in the radius of rotation are suppressed in directions in which the radius of rotation increases, whereas changes in the radius of rotation are not suppressed in directions in which the radius of rotation decreases. Through this, a worsening of the stabilization control performance caused by overcompensation due to erroneously estimating the radius of rotation can be prevented, and changes in the state of translational shakes in cases such as where a state in which large shakes occur suddenly drops to a state in which only small shakes occur can also be handled.

Meanwhile, although the gain Kd is a fixed value in the aforementioned example, there is also a method in which Kd can be made variable, using, for example, the shake state determination unit 502. For example, by varying the gain Kd depending on the shake state, or in other words, depending on the detection precision of the sensors, the estimation precision for the radius of rotation, and so on, using a table such as that shown in FIG. 8, it is possible to further prevent the radius of rotation from being erroneously estimated due to the influence of disturbances.

As described thus far, according to the first embodiment, the shake state is determined based on the output of the angular velocity sensor and the output of the acceleration sensor, an upper-limit value is set for the radius of rotation L estimated in accordance with the shake state, and after the upper-limit value is clamped, a rectifying process is carried out on the radius of rotation L. Through this, the apparatus is less susceptible to the influence of sensor noise, which makes it possible to prevent a drop in the controllability due to the erroneous detection of the radius of rotation. Furthermore, because a suitable amount of translational shake compensation can be found both when shakes are great and small, the stabilization control effects can be improved.

<Variation>

Figure 10:
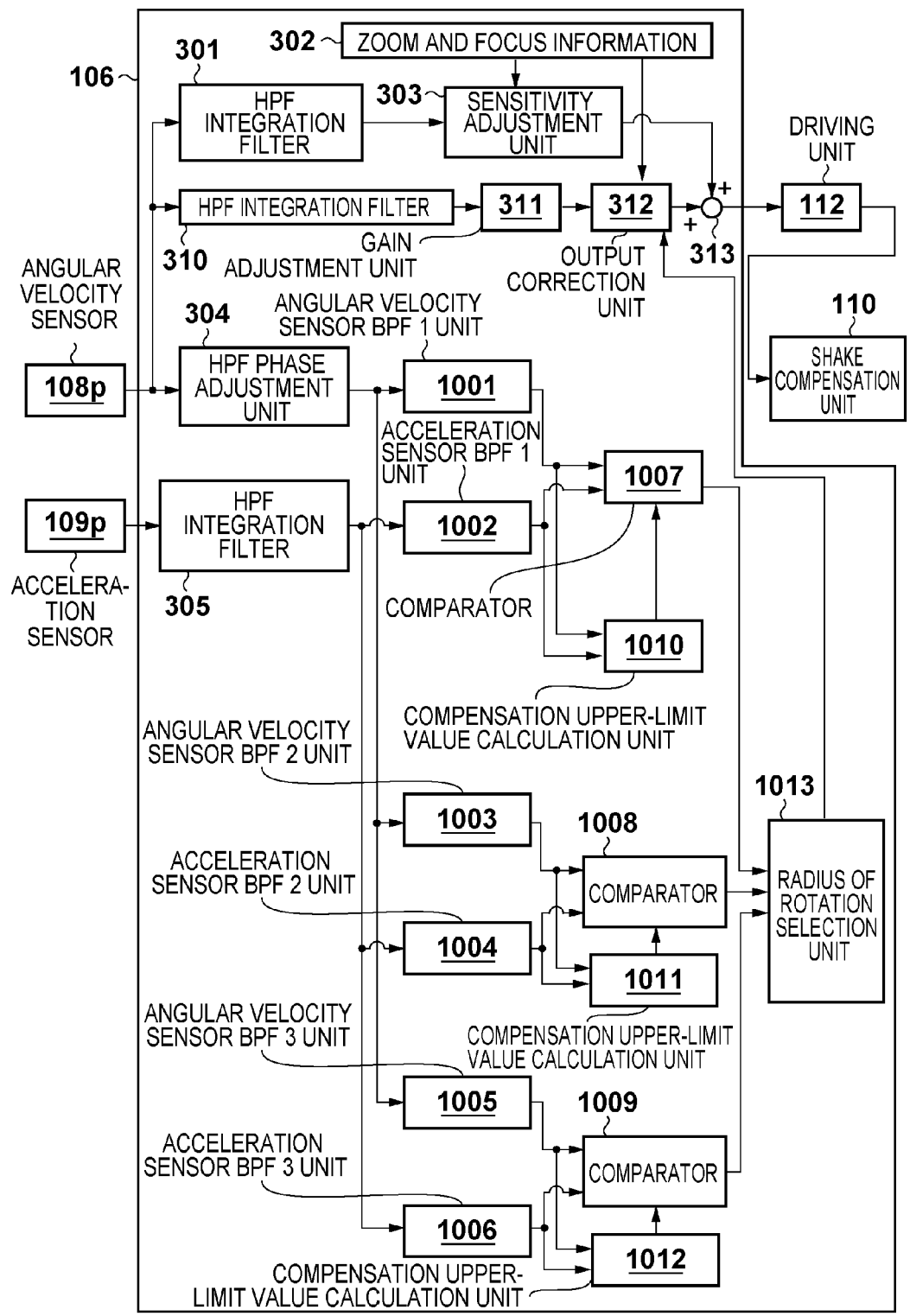
FIG. 10 is a block diagram illustrating an image stabilization control apparatus according to a variation.

The aforementioned method of the first embodiment is described as a method that calculates the radius of rotation in a single frequency band set in the angular velocity sensor BPF unit 306. However, the present invention can also be realized using a method in which changes in the radius of rotation L are detected and selected for each of multiple frequency bands. A method in which changes in the radius of rotation L are detected and selected for each of multiple frequencies is illustrated in the block diagram shown in FIG. 10. Predetermined cutoff frequencies are set for an angular velocity sensor BPF 1 unit 1001 and an acceleration sensor BPF 1 unit 1002, an angular velocity sensor BPF 2 unit 1003 and an acceleration sensor BPF 2 unit 1004, and an angular velocity sensor BPF 3 unit 1005 and an acceleration sensor BPF 3 unit 1006, respectively. For example, cutoff frequencies of 2 Hz, 5 Hz, and 10 Hz are set, compensation upper-limit values are calculated by compensation upper-limit value calculation units 1010, 1011, and 1012, and radii of rotation rectified by comparators 1007, 1008, and 1009 are found, respectively. A radius of rotation is then selected by a radius of rotation selection unit 1013, and stabilization control is then carried out according to the same method as that described in the first embodiment.

The radius of rotation selection unit 1013 may calculate an average value using the radii of rotation from the comparators 1007, 1008, and 1009, and employ that average value as the radius of rotation. Alternatively, the radius of rotation in the frequency with the greatest shake influence may be selected in accordance with the shake states in the respective frequencies and used as the radius of rotation, or the radii of rotation in the respective frequencies may be multiplied by weighting coefficients and combined, with the resultant thereof taken as the radius of rotation.

In the case where the radius of rotation in the frequency with the greatest shake influence is selected in accordance with the shake states in the respective frequencies, the output of the shake state determination unit 502 shown in FIG. 5 is taken as the shake amount for the respective frequencies. By selecting the radius of rotation of the frequency whose shake amount value is the greatest among the shake amounts in the respective frequencies, translational shakes in the frequency band that is influenced the most by translational shakes can be extracted.

On the other hand, in the case where the radii of rotation in the respective frequencies are multiplied by weighting coefficients and combined, with the resultant thereof taken as the radius of rotation, the outputs of the shake state determination unit 502 shown in FIG. 5 are taken as the shake amounts in the respective frequencies, and weighting gains are calculated for each of the frequencies based on the size of the shake amounts. (The gain is set so that the sum of the weighting gains for the respective frequencies is 1.)

Weighting gain calculation methods for the respective radii of rotation from the comparator 1007, the comparator 1008, and the comparator 1009 are illustrated hereinafter.

weighting gain 1=shake amount 1(in 1010)÷(shake amount 1(in 1010)+(shake amount 2(in 1011)+ shake amount 3(in 1012))

weighting gain 2=shake amount 2(within 1011)÷ (shake amount 1(in 1010)+(shake amount 2(in 1011)+shake amount 3(in 1012))

weighting gain 3=shake amount 3(in 1012)÷(shake amount 1(in 1010)+(shake amount 2(in 1011)+ shake amount 3(in 1012))

After the weighting gains in the respective frequencies have been multiplied with the radii of rotation in the respective frequencies, a value obtained by adding the resultants together is calculated as the radius of rotation. Through this, more appropriate translational shakes, based on the shake state, can be extracted.

Second Embodiment

Figure 11:
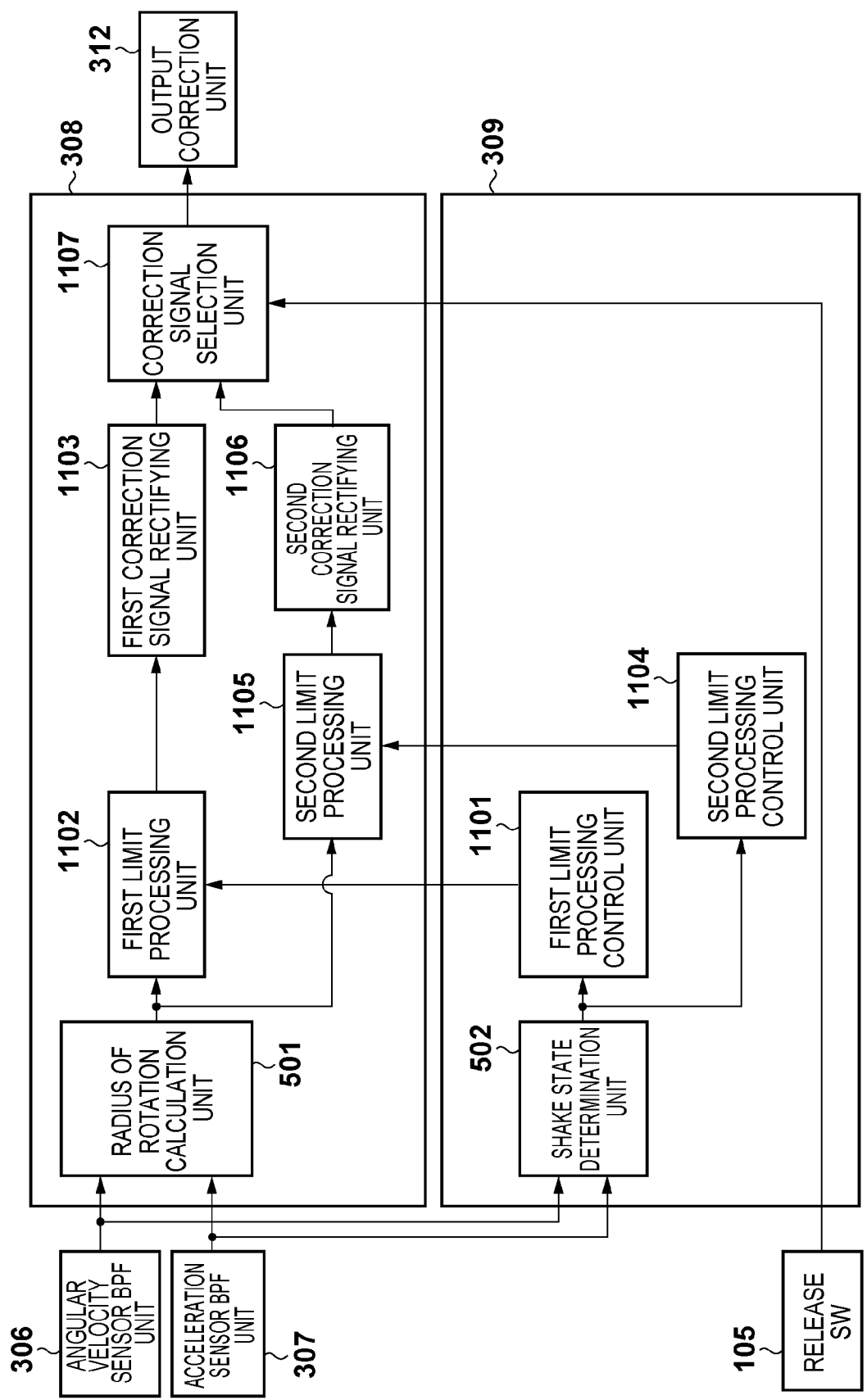
FIG. 11 is a block diagram illustrating, in detail, the configuration of a comparator and a compensation upper-limit value calculation unit according to the second embodiment.

Next, a second embodiment of the present invention will be described. In the present second embodiment, the configurations of the comparator 308 and compensation upper-limit value calculation unit 309 shown in FIG. 3 differ from those described with reference to FIGS. 5, 6, and 9 in the first embodiment. Hereinafter, the comparator 308 and the compensation upper-limit value calculation unit 309 according to the present second embodiment will be described with reference to FIG. 11.

In the second embodiment, two patterns, or a first compensation upper-limit value and a second compensation upper-limit value, are calculated as the upper-limit values for the determination of rotation, based on the shake state signal that indicates the shake state determined based on the output of the angular velocity sensor and the output of the acceleration sensor. For this reason, compared to FIG. 5, the compensation upper-limit value calculation unit 309 has a first limit processing control unit 1101 and a second limit processing control unit 1104. Meanwhile, the comparator 308 has a first limit processing unit 1102 and a second limit processing unit 1105, as well as a first correction signal rectifying unit 1103 and a second correction signal rectifying unit 1106. Furthermore, the comparator 308 includes a correction signal selection unit 1107 for selecting the output of the first correction signal rectifying unit 1103 or the second correction signal rectifying unit 1106 in accordance with the state of the release switch 105.

Here, the operations of the first limit processing unit 1102 and the second limit processing unit 1105 and the operations of the first correction signal rectifying unit 1103 and the second correction signal rectifying unit 1106 are the same as the operations of the limit processing unit 504 and the correction signal rectifying unit 505 illustrated in FIG. 5. However, the processes performed by the first limit processing control unit 1101 and the second limit processing control unit 1104 differ from the processes performed by the limit processing control unit 503 illustrated in FIG. 5.

Figure 12:
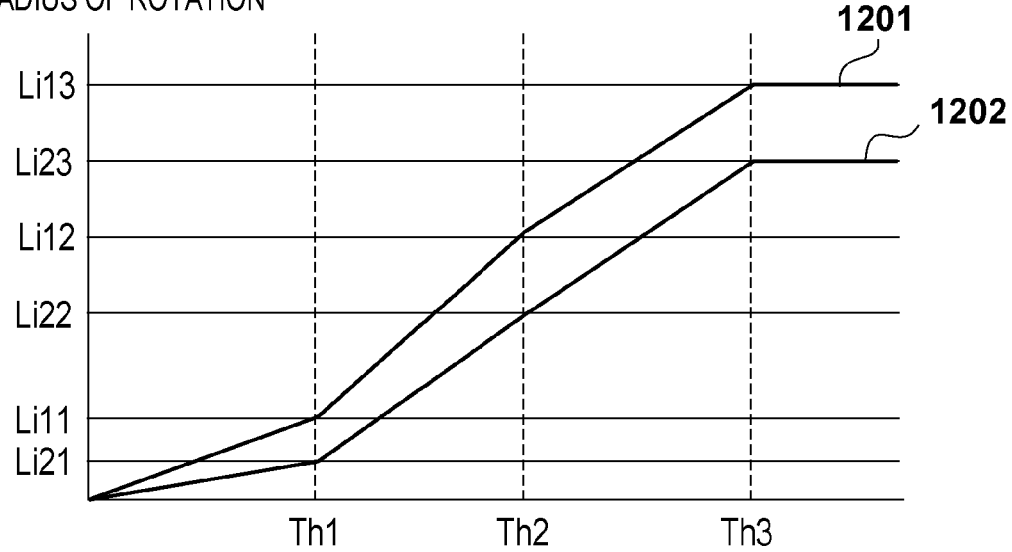
FIG. 12 is a diagram illustrating a relationship between a shake state and the upper-limit value of a radius of rotation according to the second embodiment.

The first limit processing control unit 1101 and the second limit processing control unit 1104 each calculate compensation upper-limit values by referring to the tables indicated by 1202 and 1201, respectively, in FIG. 12. Note that the method for determining the upper-limit value of the radius of rotation using these tables 1201 and 1202 is the same as the method described in the first embodiment using FIG. 8.

In this manner, the upper-limit value of the radius of rotation output from the second limit processing control unit 1104 is greater than the upper-limit value of the radius of rotation output from the first limit processing control unit 1101. Accordingly, the output of the second correction signal rectifying unit 1106 is a value that is greater than or equal to the output of the first correction signal rectifying unit 1103. The output of the first correction signal rectifying unit 1103 and the output of the second correction signal rectifying unit 1106 are input into the correction signal selection unit 1107, and which of these outputs is to be input into the output correction unit 312 is selected in accordance with the state of the release switch 105, which is input at the same time.

In the case where the release switch 105 is SW2 ON (that is, is instructing shooting operations), the output of the second correction signal rectifying unit 1106 is selected. On the other hand, in the case where SW2 is not ON, or in other words, in a state in which SW1 is ON (that is, is instructing shooting preparation operations) or the release switch 105 is not being depressed, the output of the first correction signal rectifying unit 1103 is selected. As illustrated by Formula (5), the shake amount Y of the translational shakes is found by multiplying the radius of rotation L by the shake angle θ, and thus the control in states aside from when SW2 is ON is a stabilization control in which the translational shake control amount has been reduced. However, the same driving range as the driving range of the driving unit 112 of the image stabilization control apparatus when SW2 is ON can be ensured.

Meanwhile, in the case where SW2 of the release switch 105 is ON, the output of the second correction signal rectifying unit 1106 is selected, whereas in the case where SW1 of the release switch 105 is ON, the output of the first correction signal rectifying unit 1103 is selected. Furthermore, in the case where the release switch 105 has not been depressed, the output of the correction signal selection unit 1107 may be set to 0 so as to omit translational shake control.

As described thus far, according to the second embodiment, the compensation upper-limit value and correction value (radius of rotation) are selected in accordance with the state of the release switch 105, and the stabilization amount for the translational shakes is switched. Accordingly, the stabilization control is carried out with a reduced amount of translational shake control while SW1 is ON and shooting preparations are being carried out, which makes it possible to prevent disturbances in images due to a worsening in stabilization control caused by the radius of rotation being erroneously detected during the shooting preparations. Furthermore, because the translational shake control amount is reduced while SW1 is ON and shooting preparations are being carried out, it is possible to ensure a driving range when SW2 is ON and shooting operations are being carried out; this improves the stabilization performance during shooting.

Third Embodiment

Figure 13:
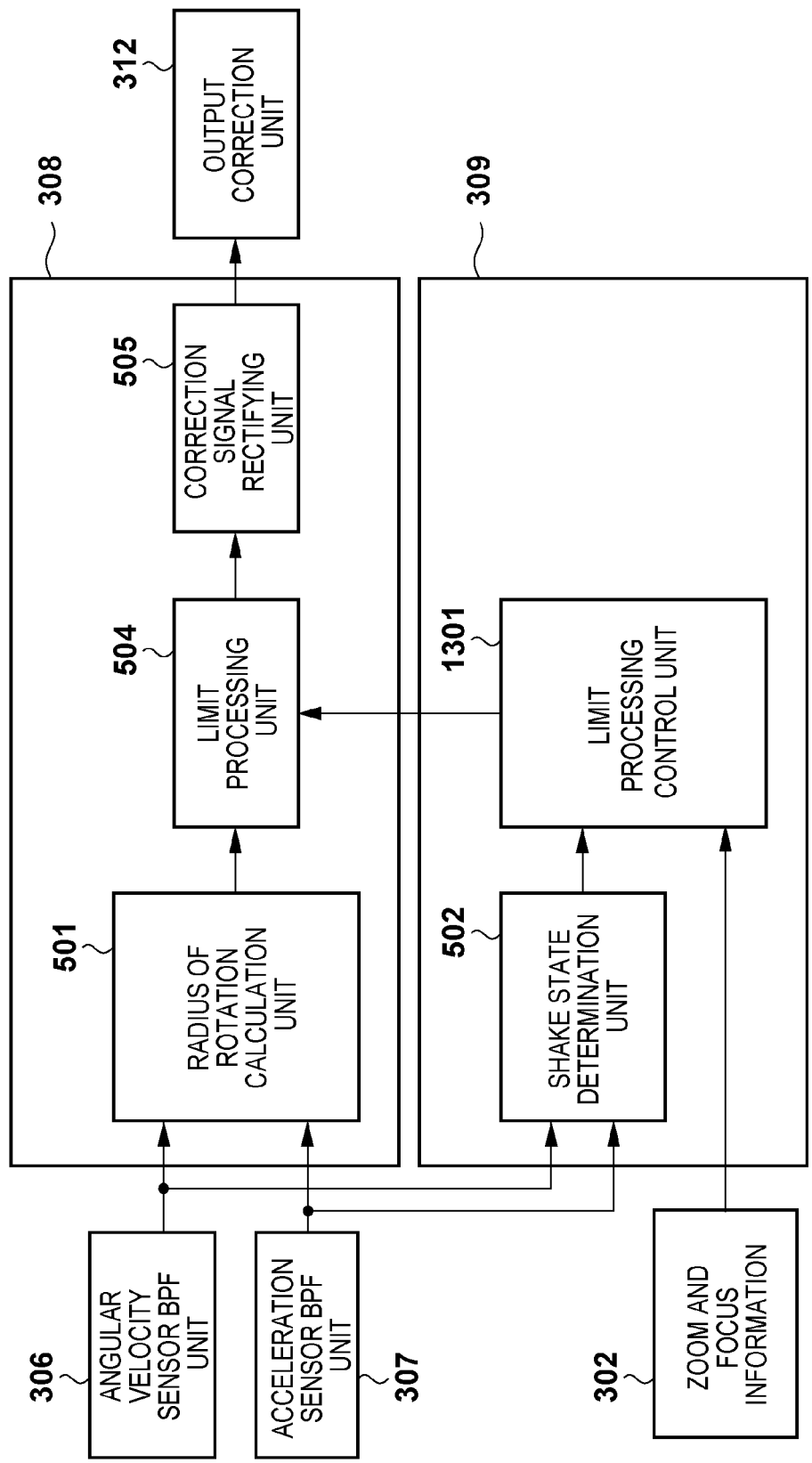
FIG. 13 is a block diagram illustrating, in detail, the configuration of a comparator and a compensation upper-limit value calculation unit according to a third embodiment.

Next, a third embodiment of the present invention will be described. In the present third embodiment, the configuration of the compensation upper-limit value calculation unit 309 shown in FIG. 3 differs from those described in the first and second embodiments. Hereinafter, the compensation upper-limit value calculation unit 309 according to the present third embodiment will be described with reference to FIG. 13.

In the third embodiment, the upper-limit value for rotation determination is set based on the shake state signal, in which the shake state is determined in accordance with the output of the angular velocity sensor and the output of the acceleration sensor, and based on the zoom and focus information 302. For this reason, compared to FIG. 5, a limit processing control unit 1301 takes, as its input, the output from the shake state determination unit 502 and the zoom and focus information 302. The magnification ratio β found based on the zoom and focus information 302 is used by the limit processing control unit 1301.

For example, in the case where the magnification ratio β is greater than a predetermined magnification ratio βth, or in other words, the translational shake amount has increased, as in the case with macro shooting, the limit processing control unit 1301 refers to the table indicated by 1201 in FIG. 12. On the other hand, in the case where the magnification ratio β is equal to or less than the magnification ratio βth, the limit processing control unit 1301 refers to the table indicated by 1202. Note that the method for determining the upper-limit value of the radius of rotation using these tables 1201 and 1202 is the same as the method described in the first embodiment using FIG. 8, and thus descriptions thereof will be omitted here.

As can be seen from the second terms on the right sides in the aforementioned Formulas (4) and (5), the translational shake amount increases as the magnification ratio β increases, whereas the translational shake amount decreases as the magnification ratio β decreases. Thus, although a high degree of image blur will appear if translational shake compensation is not actively carried out when the magnification ratio β is high, the image blur caused by the influence of translational shakes is insignificant enough to ignore when the magnification ratio β is low, even if translational shake compensation is not actively carried out.

Accordingly, a high upper-limit value of the radius of rotation is set when the magnification ratio β is high, and a low upper-limit value of the radius of rotation is set when the magnification ratio β is low, which makes it possible to prevent the overcompensation of translational shakes due to erroneously detecting the radius of rotation.

Fourth Embodiment

Next, a fourth embodiment of the present invention will be described. Although the comparator 308 and the compensation upper-limit value calculation unit 309 according to the fourth embodiment are configured the same as those described with reference to FIG. 13 in the third embodiment, the method for determining the upper-limit value of the radius of rotation is different.

In the case where the focal length f is extremely high, the angle of view decreases, which in turn leads to an increase in the user carrying out shooting operations at a desired timing while tracking and framing the subject he or she wishes to shoot, carrying out shooting operations while adjusting shift in the angle of view caused by hand shakes, and so on. In other words, there are translational shakes resulting from unintended hand shakes on the part of the user and the translational shakes caused by the user intentionally moving the camera, which increases translational shakes as a whole. Thus, the calculation of the radius of rotation L in the aforementioned translational shake compensation method is also affected.

Accordingly, the focal length f is found based on the zoom and focus information 302. Then, in the case where the found focal length f is longer than a predetermined focal length fth and there is a high possibility that the user is intentionally moving the camera in order to frame a shot, the upper-limit value of the radius of rotation L is set to be lower than the upper-limit value in the case where the focal length f is equal to or less than the focal length fth. Through this, the stabilization performance can be prevented from worsening due to the erroneous detection of the radius of rotation caused by the influence of translational shake resulting from hand shakes.

Fifth Embodiment

Figure 14:
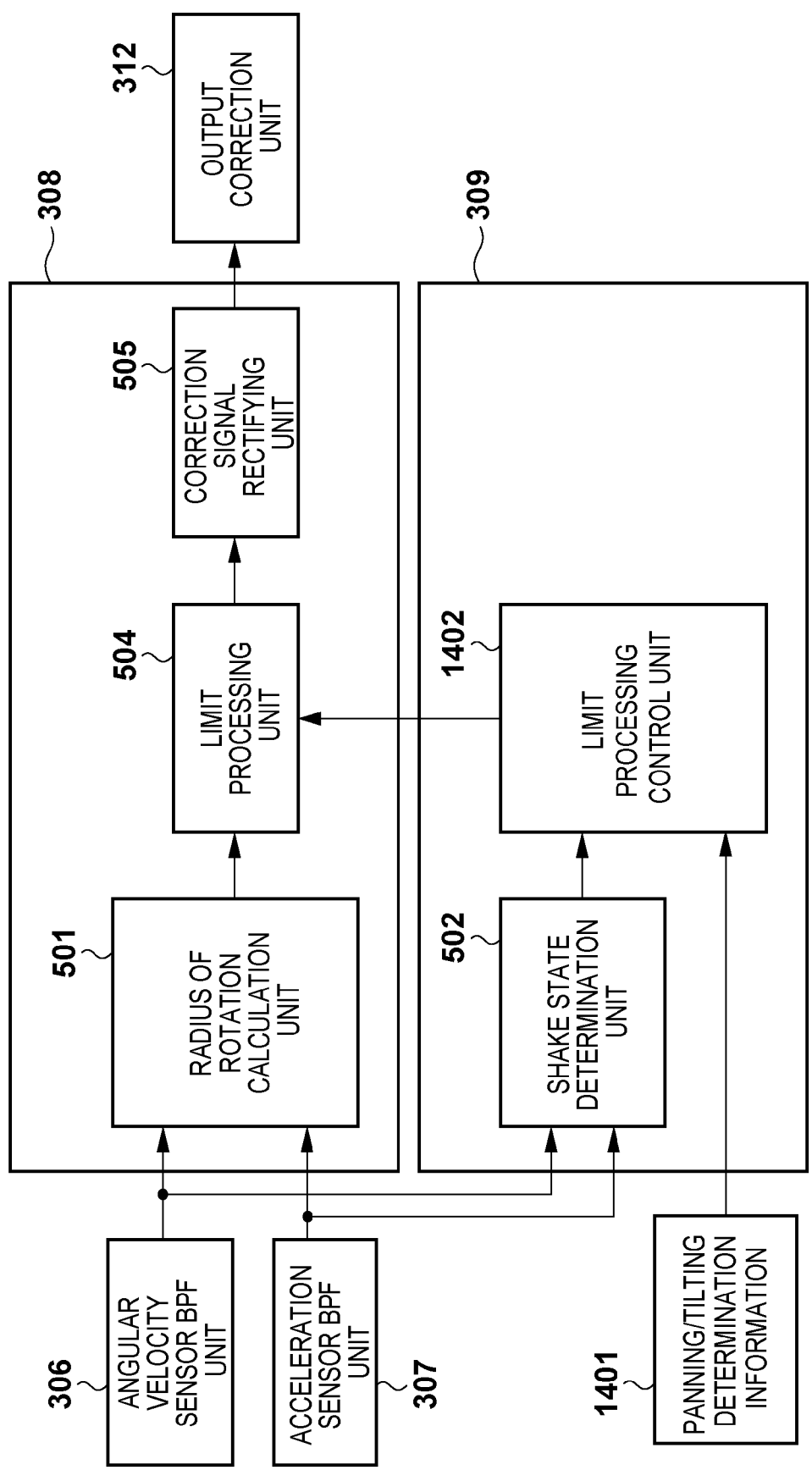
FIG. 14 is a block diagram illustrating, in detail, the configuration of a comparator and a compensation upper-limit value calculation unit according to a fifth embodiment.

Next, a fifth embodiment of the present invention will be described. In the fifth embodiment, the configuration of the compensation upper-limit value calculation unit 309 shown in FIG. 3 differs from those described in the first through fourth embodiments. Hereinafter, the compensation upper-limit value calculation unit 309 according to the present fifth embodiment will be described with reference to FIG. 14.

In the fifth embodiment, the upper-limit value of the radius of rotation is set based on the shake state signal, in which the shake state is determined based on the output of the angular velocity sensor and the output of the acceleration sensor, and based on panning/tilting determination information. For this reason, compared to FIG. 5, the limit processing control unit 1301 takes, as its input, the output from the shake state determination unit 502 and panning/tilting determination information 1401.

Figure 8:
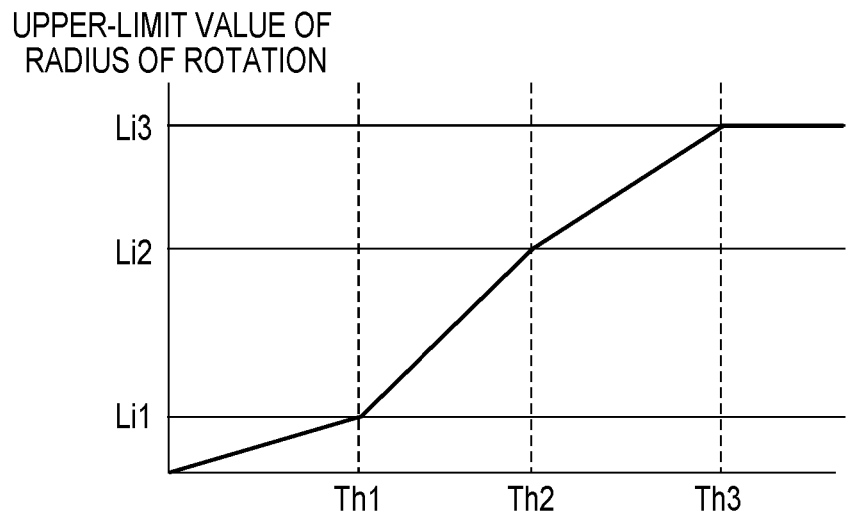
FIG. 8 is a diagram illustrating a relationship between a shake state and the upper-limit value of a radius of rotation according to the first embodiment.

If it has been determined based on the panning/tilting determination information 1401 that panning/tilting is not being carried out, the table in FIG. 8 is referred to, and control is carried out as per the first embodiment. However, if it has been determined based on the panning/tilting determination information 1401 that panning/tilting is being carried out, the upper-limit value of the radius of rotation is set to 0 and output without referring to the table in FIG. 8.

Note that the upper-limit value of the radius of rotation may be fixed at the upper-limit value one sample previous to when it has been determined that panning/tilting is being carried out.

The reasons for changing the upper-limit value of the radius of rotation depending on the panning/tilting determination will be described hereinafter.

During panning/tilting, a larger radius of rotation is calculated. However, in the case where shooting is carried out during panning/tilting, it is not desirable to carry out stabilization control for hand shakes in pan or tilt directions in which the camera is being intentionally moved, such as in the case where the user wishes to shoot an intentionally blurry image in order to capture motion blur or the like. In other words, since a control to invalidate the stabilization control for hand shakes in the pan direction or the tilt direction in which the camera is being moved is carried out, it is not necessary to estimate the radius of rotation shake and carry out translational shake control.

Meanwhile, erroneous estimation of the radius of rotation can be problematic in the case where shooting is carried out immediately after panning/tilting. In order to prevent a sudden fluctuation in the estimated value of the radius of rotation, an erroneous estimation of the radius of rotation, and so on in the estimation calculation for the radius of rotation, the radius of rotation is estimated by taking a value that has been averaged in time sequence, providing a rectifier such as that shown in FIG. 9 and described in the first embodiment.

Here, it is assumed that the radius of rotation that has been estimated during panning/tilting is 500 mm, and the radius of rotation during shooting immediately following the panning/tilting is 100 mm. In this case, it takes time for the estimated radius of rotation to converge on 100 mm from 500 mm, and if shooting operations are carried out while the value is converging in this manner, the estimated radius of rotation will be larger than 100 mm; this can result in overcompensation, which worsens the stabilization performance.

Accordingly, it is desirable to set the upper-limit value of the radius of rotation to be low during panning/tilting. For this reason, setting the upper-limit value during panning/tilting to 0 makes it possible to prevent the stabilization control performance from worsening due to an excessive amount of translational shake compensation resulting from erroneously estimating the radius of rotation during shooting immediately after panning/tilting.

Sixth Embodiment

Figure 15:
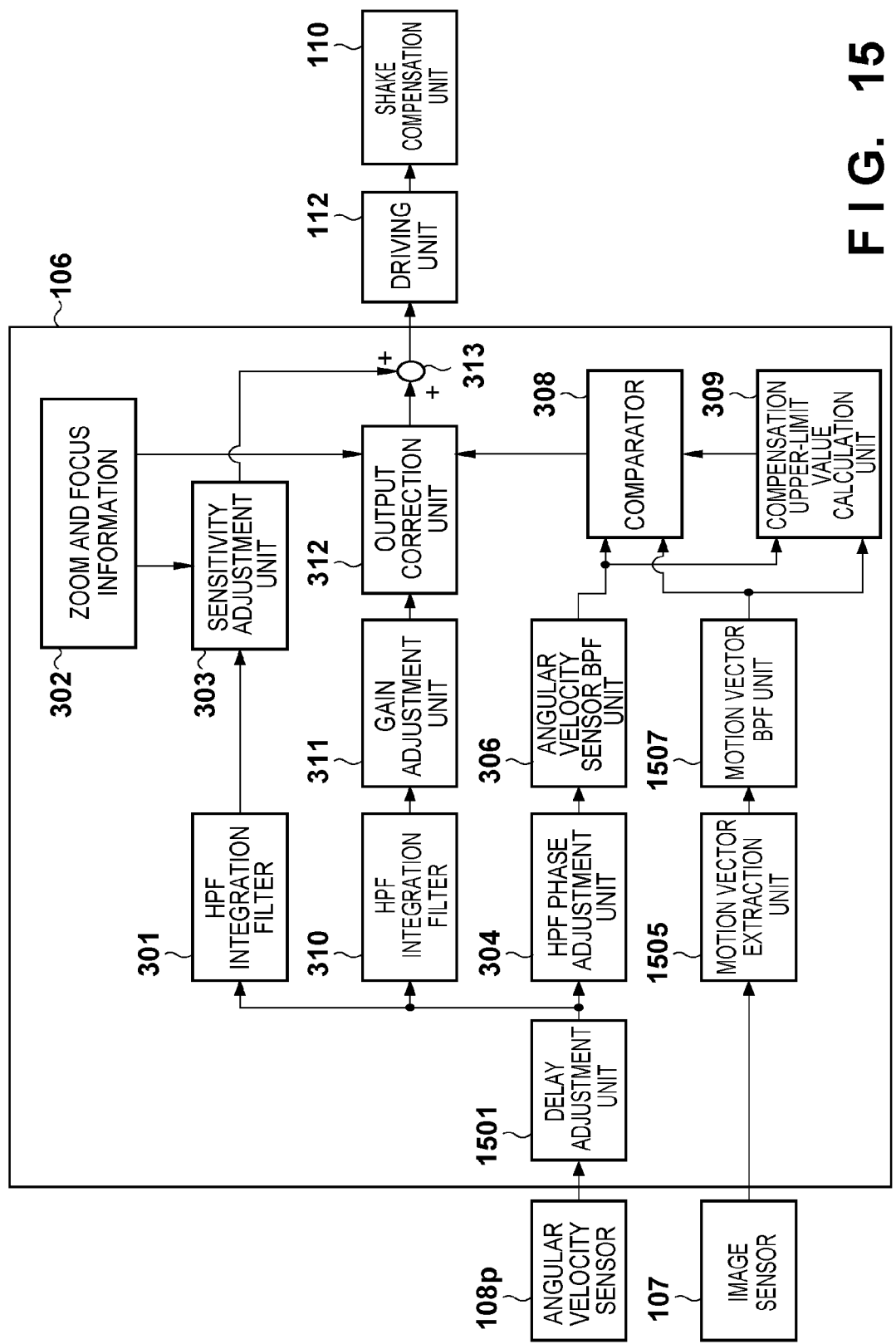
FIG. 15 is a block diagram illustrating an image stabilization control apparatus according to a sixth embodiment.

Next, a sixth embodiment of the present invention will be described. The present sixth embodiment describes a case in which the translational shake amount is detected using multiple images obtained at different times from the image sensor 107, instead of the acceleration sensor 109*p*. FIG. 15 is a block diagram illustrating the image stabilization control apparatus according to the present sixth embodiment.

Compared to the configuration illustrated in FIG. 3, the configuration illustrated in FIG. 15 adds a delay adjustment unit 1501, and furthermore, a motion vector extraction unit 1505 and a motion vector BPF unit 1507 are used instead of the HPF integration filter 305 and the acceleration sensor BPF unit 307.

Methods that detect hand shakes, shift in compositions, and so on by comparing the respective images output by the image sensor 107 at predetermined time intervals are widely known, and are being employed as electronic stabilization or image composition techniques. In the present sixth embodiment, the motion vector extraction unit 1505 extracts motion vectors from images output from the image sensor 107, and motion vectors for each unit time are found for the times at which the angular velocity sensor 108*p* outputs an angular velocity signal. Then, the motion vector for each unit time is divided into a translational shake component in the pitch direction and a translational shake component in the yaw direction. Here, the motion vector in the pitch direction is output to the motion vector BPF unit 1507, and only a frequency component in a predetermined bandwidth is extracted. Thereafter, the processing carried out by the comparator 308 and the compensation upper-limit value calculation unit 309 is the processing described in the first through the fifth embodiments, and thus descriptions thereof will be omitted here.

Note that in the case where the motion vector of the image sensor 107 has been found in a state in which a shake compensation unit is driven and rotational shake compensation has been carried out, the motion vectors between the respective images output by the image sensor correspond to image shift caused by the translational shake component. In this case, the rotational shake compensation target value may be found using a sensitivity adjustment unit, zoom/focus information, and so on, and the shake compensation may be carried out during shooting using the translational shake compensation target value in combination therewith.

Note that in the case where translational shakes are detected by comparing the images output from the image sensor 107, the timing at which the detection is carried out is later than the timing at which the angular velocity signal is obtained from the angular velocity sensor 108*p* by an amount of time equivalent to the amount of time required to process the images. The delay adjustment unit 1501 is provided in order to adjust that delay, and it is therefore possible to detect the rotational shake at the same time.

It should be noted that the present invention is not limited to image stabilization control apparatuses in single-lens reflex digital cameras or compact digital cameras, and the present invention can also be applied in digital video cameras, surveillance cameras, web cameras, imaging apparatuses in mobile telephones, and so on.

In addition, the aforementioned first through sixth embodiments can be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-179007, filed on Aug. 9, 2010, which is hereby incorporated by reference herein in its entirety.

What is claimed is:

1. An image stabilization control apparatus that includes a compensation member, the apparatus comprising:
a first detection unit that detects rotational shakes;
a second detection unit that detects translational shakes in the image stabilization control apparatus using a different method than the first detection unit;
a rotational shake amount calculation unit that finds a rotational shake amount based on an output of the first detection unit;
a correction value calculation unit that calculates a correction value based on outputs from the first and second detection units;
a suppression unit that calculates an upper-limit value of the correction value based on the size of an output from at least one of the first and second detection units and suppresses the correction value using the upper-limit value as an upper limit;
a translational shake amount calculation unit that calculates a translational shake amount using the output of the first detection unit and the correction value calculated by the correction value calculation unit; and
a driving unit that drives the compensation member based on the rotational shake amount and the translational shake amount,
wherein the correction value calculation unit calculates the correction value based on the suppressed correction value.

2. The apparatus according to claim 1, wherein
the correction value calculation unit calculates multiple correction values by processing the signals of different frequency bands in the outputs of the first and second detection units,
the suppression unit calculates multiple upper-limit values corresponding to the respective correction values based on the multiple correction values, and suppresses the correction values using the upper-limit values as upper limits, and
the image stabilization control apparatus further comprises a selection unit that selects one of the multiple correction values and outputs the selected correction value to the translational shake amount calculation unit.

3. The apparatus according to claim 1, wherein the image stabilization control apparatus is a part of an optical imaging system provided with a zoom lens and a focus lens, and further comprises:
a magnification ratio calculation unit that finds a magnification ratio from information of the zoom lens and the focus lens in the optical imaging system,
wherein the suppression unit lowers the upper-limit value in the case where the magnification ratio is lower than a predetermined magnification ratio.

4. The apparatus according to claim 1, wherein the image stabilization control apparatus is a part of an optical imaging system provided with a zoom lens and a focus lens, and further comprises:
a focal length calculation unit that finds a focal length from information of the zoom lens and the focus lens in the optical imaging system,
wherein the suppression unit lowers the upper-limit value in the case where the focal length is longer than a predetermined focal length.

5. The apparatus according to claim 1, wherein the image stabilization control apparatus is a part of an optical imaging system, and further comprises:
a panning determination unit that determines whether the optical imaging system or an apparatus to which the optical imaging system is attached is panning or tilting,
wherein the suppression unit lowers the upper-limit value when it has been determined that panning or tilting is occurring.

6. The apparatus according to claim 1, wherein the correction value calculation unit includes:
a first calculation unit that calculates the correction amount based on the outputs of the first and second detection units;
a second calculation unit that calculates, from the correction amount, an upper-limit correction value whose upper limit is the upper-limit value; and
a third calculation unit that calculates a rectified correction value obtained by rectifying the upper limit correction value, and
wherein the correction value calculation unit outputs the rectified correction value to the translational shake amount calculation unit.

7. An optical apparatus comprising:
the image stabilization control apparatus according to claim 1; and
a release switch that instructs a shooting preparation operation and a shooting operation,
wherein the suppression unit includes:
a first upper-limit value calculation unit that calculates a first upper-limit value based on the size of the output from at least one of the first and second detection units; and
a second upper-limit value calculation unit that calculates a second upper-limit value, that is higher than the first upper-limit value, based on the size of the output from at least one of the first and second detection units, and
wherein the correction value calculation unit includes:
a first correction value calculation unit that calculates a first correction value, whose upper limit is the first upper-limit value, based on the outputs of the first and second detection units;
a second correction value calculation unit that calculates a second correction value, whose upper limit is the second upper-limit value, based on the outputs of the first and second detection units; and
a selection unit that selects whether to use the first correction value or the second correction value, and
wherein the selection unit selects the first correction value in the case where the shooting preparation operation is instructed by the release switch, and selects the second correction value in the case where the shooting operation is instructed by the release switch.

8. An imaging apparatus comprising the image stabilization control apparatus according to claim 1.

9. A control method for an image stabilization control apparatus that includes a compensation member, the method comprising:
- a first detecting step of detecting rotational shakes in the image stabilization control apparatus;
- a second detecting step of detecting translational shakes in the image stabilization control apparatus using a different method than the first detecting step;
- a rotational shake amount calculating step of finding a rotational shake amount based on the result of the first detecting step;
- a correction value calculating step of calculating a correction value based on the results of the first and second detecting steps;
- a suppressing step of calculating an upper-limit value of the correction value based on the size of the result of at least one of the first and second detecting steps and suppressing the correction value using the upper-limit value as an upper limit;
- a translational shake amount calculating step of calculating a translational shake amount using the result of the first detecting step and the correction value calculated in the correction value calculating step; and
- a driving step of driving the compensation member based on the rotational shake amount and the translational shake amount,
- wherein in the correction value calculating step, the correction value is calculated based on the suppressed correction value.

10. The control method according to claim 9, wherein in the correction value calculating step, multiple correction values are calculated by processing the signals of different frequency bands in the shakes detected in the first and second detecting steps,
- in the suppressing step, multiple upper-limit values are calculated corresponding to the respective correction values based on the multiple correction values, and the correction values are suppressed using the upper-limit values as upper limits, and
- the control method further comprises a selection step of selecting one of the multiple correction values and the selected correction value is used in the translational shake amount calculating step.

11. The control method according to claim 9, wherein the image stabilization control apparatus is a part of an optical imaging system provided with a zoom lens and a focus lens, and further comprises a magnification ratio calculation unit that finds a magnification ratio from information of the zoom lens and the focus lens in the optical imaging system,
- wherein in the suppressing step, the upper-limit value is lowered in the case where the magnification ratio is lower than a predetermined magnification ratio.

12. The control method according to claim 9, wherein the image stabilization control apparatus is a part of an optical imaging system provided with a zoom lens and a focus lens, and the control method further comprises:
- a focal length calculation step of finding a focal length from information of the zoom lens and the focus lens in the optical imaging system,
- wherein in the suppressing step, the upper-limit value is lowered in the case where the focal length is longer than a predetermined focal length.

13. The control method according to claim 9, wherein the image stabilization control apparatus is a part of an optical imaging system, and the control method further comprises:
- a panning determination step of determining whether the optical imaging system or an apparatus to which the optical imaging system is attached is panning or tilting,
- wherein in the suppressing step, the upper-limit value is lowered when it has been determined that panning or tilting is occurring.

14. The control method according to claim 9, wherein the correction value calculating step includes:
- a first calculating step of calculating the correction amount based on the size of the shakes detected in the first and second detection steps;
- a second calculating step of calculating, from the correction amount, an upper-limit correction value whose upper limit is the upper-limit value; and
- a third calculating step of calculating a rectified correction value obtained by rectifying the upper limit correction value, and
- wherein the rectified correction value calculated in the correction value calculating step is used in the translational shake amount calculating step.

* * * * *